United States Patent Office 3,299,627
Patented Jan. 24, 1967

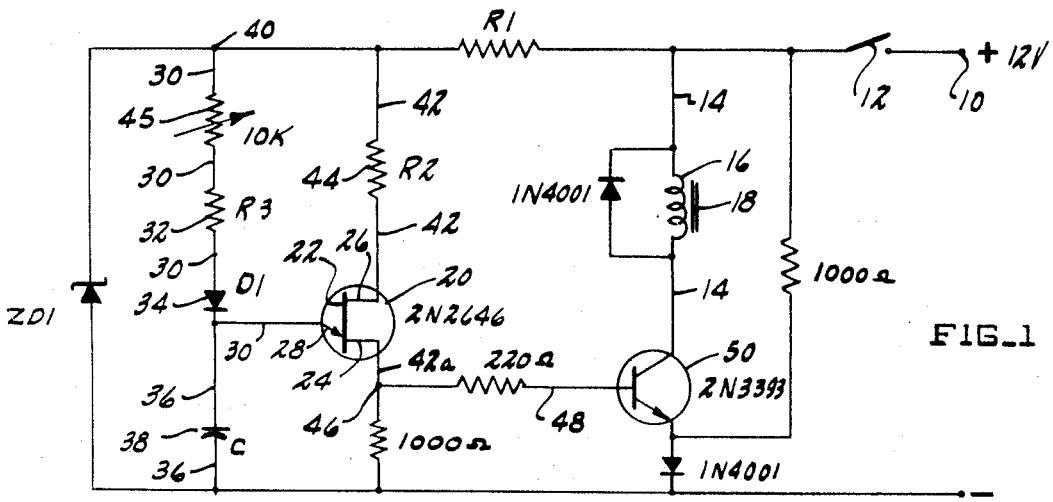
FIG_1
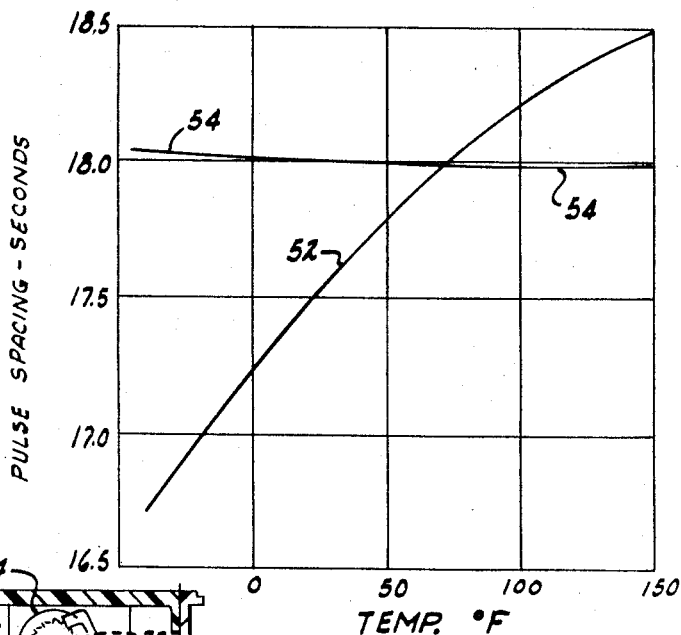
FIG_2
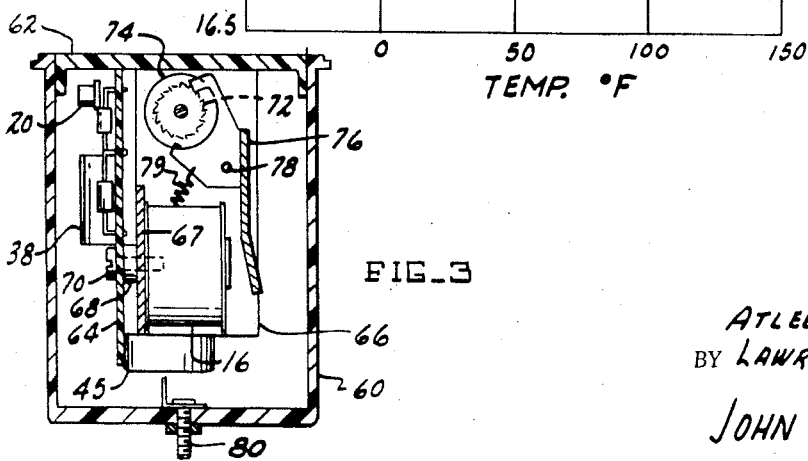
FIG_3
INVENTOR.
ATLEE S. HART
BY LAWRENCE G. MALLETT
JOHN E. McRAE
ATTORNEY

3,299,627
ELAPSED TIME METER
Atlee S. Hart, Oak Park, and Lawrence George Mallett, Walled Lake, Mich., assignors to American Radiator & Standard Sanitary Corporation, New York, N.Y., a corporation of Delaware
Filed Feb. 8, 1965, Ser. No. 431,057
2 Claims. (Cl. 58—145)

This invention relates to an elapsed time meter having particular utility as a device for indicating the cumulative running time of electric ignition engines, such as tractor engines and stationary engines. Such record of the total running time facilitates preventive maintenance procedures.

Various elapsed time meters have been used for the instant purpose, but in many cases their accuracy and service life has suffered by reason of the temperature extremes and operating conditions to which the engines are frequently exposed. The present invention therefore has for its primary object the provision of an elapsed time meter which accurately records running time of electric ignition engines irrespective of variations in ambient temperature.

A further object is to provide an elapsed time meter having a reasonably low cost and satisfactory service life.

In the drawing:

FIGURE 1 is a diagram of a circuit employing the invention;

FIG. 2 is a chart illustrating the relative performance of two meters, one incorporating the invention and one not incorporating the invention; and FIG. 3 is a sectional view through a meter incorporating the invention.

As shown in FIG. 1, there is provided a source of positive potential 10 such as is commonly encountered in conventional battery ignition systems for internal combustion engines used on trucks, tractors, and stationary applications. At 12 there is illustrated an ignition switch which controls the on-off periods for the engine, i.e., when the switch is closed the engine is on and when the switch is open the engine is off.

Connected with ignition switch 12 is a first branch line 14 having an inductive coil 16 therein which cooperates with a magnetic circuit to form the input for an electrical pulse counter. Such a pulse counter commonly includes a pawl-ratchet mechanism wherein the pawl is connected with the armature for coil 16, and the ratchet is connected with five counting wheels by suitable gearing (not shown). The different counting wheels can be numbered in tenths of hours, hours, tens of hours, hundreds of hours, and thousands of hours engine running time. With such an arrangement the tenths of hours wheel can be subdivided into twenty divisions, each representing eighteen seconds. Electrical pulses delivered to coil 16 at eighteen second intervals are then effectve to index the ratchet and associated counting wheels at the desired rates.

The pulses for coil 16 are initially derived from a circuit which includes a double base diode or uni-junction transistor 20 having a bar of N-type material 22 which has its base 1 connected at 24 with line 42 and its base 2 connected at 26 with line 42. The emitter 28 is connected with line 30. In operation, the uni-junction transistor conducts working current from base 2 through bar 22 and base 1 only when the potential applied to emitter 28 is above a predetermined value. When the emitter potential drops below this predetermined value the transistor working circuit becomes non-conducting. By periodically varying the emitter potential to values above and below the necessary value it is possible to produce electrical pulses which can ultimately be applied to counter coil 16.

To vary the emitter potential we provide the aforementioned branch line 30 which includes diode 34 and resistances 32 and 45. Connected with line 30 is an additional line 36 containing a capacitor 38. Assuming a steady voltage at junction 40, capacitor 38 will initially charge through resistances 32, 45 and diode 34, whereby the potential at emitter 28 will be less than the value necessary to sustain working current in the base 2–base 1 circuit. Under such conditions the uni-junction transistor will be in a non-conducting state.

As capacitor 38 becomes charged the potential at emitter 28 rises and eventually becomes greater than the firing voltage; the capacitor is thereafter discharged through emitter 28 and the base 1 circuit to make the transistor conducting. The working current and capacitor discharge current are thus conducted through branch line 42a, junction 46, line 48, and the base of a transistor amplifier 50. An amplified current in the collector-emitter circuit of transistor 50 is thus applied through branch line 14 and the pulse counter coil 16.

As capacitor 38 discharges through emitter 28 the emitter potential drops below the firing level of the uni-junction transistor, and capacitor 38 must then be recharged through line 30 to build up the emitter potential for developing another working pulse in the base 2–base 1 circuit. The alternate charging and discharging of capacitor 38 produces timed electrical pulses in the working circuit of the uni-junction transistor 20 which are amplified in transistor 50 and applied to the counter coil 16.

It will be noted that the illustrated circuit includes a diode 34 in charging line 30. The circuit will operate in a fashion without this diode. However when the circuit is employed wthout diode 34 the charging rate of the capacitor is considerably influenced by variations in ambient temperature. At low ambient temperatures such as −40° F. the charging rate is relatively high, and the pulse spacing in seconds is relatively short. At higher ambient temperatures such as +150° F., the charging rate for the same capacitor is relatively slow, and the pulse spacing is longer. Curve 52 in the FIG. 2 chart illustrates the pulse spacings obtained in a typical circuit without diode 34. It will be noted that the pulse spacing varies considerably from about 16.7 seconds at −40° F. to about 18.5 seconds at +150° F.

By using diode 34 in the circuit it is possible to substantially eliminate the variations in pulse spacing due to ambient temperature variations on all of the temperature sensitive components. Curve 54 illustrates a typical performance of the circuit using diode 34. The diode has a negative temperature coefficient of voltage which modifies current flow through line 30 to provide a substantially constant capacitor charging time irrespective of substantial variations in ambient temperature. The diode and capacitor must be matched to one another to provide desired curve 54.

In a typical circuit the various components might have the following values:

Zener diode $ZD_1$ _____ 8.2 volts.
Capacitance 38 _____ 100 μf.
Resistance 44 _____ 510 Ω.
Diode 34 _____ IN4001.

The illustrated circuit is comparatively simple, and is well adapted to the building of a meter having low cost and small size. FIG. 3 illustrates one form which the meter can take. As there shown, the meter comprises a cup-shaped plastic case 60 having an opening in one of its ends which is closed by a cap or end wall 62, also preferably formed of plastic.

Inserted into case 60 is a dielectric circuit board 64 having certain ones of the FIG. 1 electrical components disposed on its left face. The components are provided with conventional wire terminals which extend through openings in board 64 to connect with printed circuit lines on the board right face.

Counter coil 16 is located rightwardly of board 64 within a U-shaped magnetic frame 66 which has its web wall 67 mounted on the board by means of a spacer 68 and single screw 70. The frame not only serves as a magnetic flux carrier but also as a means for mounting ratchet wheel 72 and the five axially aligned counter wheels 74. Cooperating with the ratchet is a pawl member 76 mounted on a pivot shaft 78 and defining an armature for movement toward and away from the core for coil 16. It will be understood that each electrical pulse delivered by coil 16 produces a pivotal motion of pawl 76 and a clockwise indexing of ratchet 72. In the illustrated unit a tension spring 79 is provided to return pawl 76 and complete the indexing cycle.

Assuming pulse frequencies of 18 seconds, ratchet wheel 72 can be provided with twenty teeth to produce one complete ratchet wheel rotation every six minutes. Suitable gear reduction (not visible) between ratchet wheel 72 and the tenths of hours counter wheel provides a one-tenth revolution of said counterwheel for each ratchet wheel revolution. Similar gear reductions (not visible) are provided between the successive counter wheels (hours, tens of hours, hundreds of hours, and thousands of hours) to provide the desired counter wheel movements. Preferably the peripheral edges of the various counter wheels are numbered so that the numbers appear visible through a centrally located transparent portion of cap 62. The cap outer surface can be suitably imprinted to indicate the significance of each visible number. While conceivably the wheels can be indexed by various pulse frequencies the chosen eighteen second frequency is preferred because it appears to provide the best compromise between electrical component size and accuracy, and reduction gearing simplicity. When materially longer pulse spacings are employed the size and cost of the capacitor is increased considerably, and the accuracy of pulse spacing is decreased. When materially shorter pulse spacings are employed the complexity of the reduction gearing is undesirably increased.

It will be noted from FIG. 3 that all of the meter parts are mounted on board 64. Therefore during manufacture a sub-assembly can be built around board 64, and then assembled to the counter mechanism by means of screw 70; the assembly can then be inserted into case 60. Preferably the case wall is formed with grooves and shoulders to guide board 64 as it is inserted, and to position the board correctly after insertion. The assembly is automatically retained in its inserted position by cap 62, which can be affixed to case 60 in any appropriate manner as for example by adhesive around the inner surface of the case mouth. Two lead-in terminals 80 (only one visible) can be pre-wired to the meter circuit and installed in the case as part of the aforementioned assembly. The assembled meter can be a fairly small size item having a case diameter on the order of two inches.

What is claimed is:

1. An elapsed time meter comprising a uni-junction transistor having an emitter and a base 2–base 1 circuit; an electrical pulse counter; means for periodically developing an emitter potential sufficient to generate pulses in the base 2–base 1 circuit; and means for amplifying the pulses and delivering same to the pulse counter; the aforementioned potential-developing means comprising a chargeable capacitor, a charging circuit for said capacitor and a diode located in said charging circuit to maintain a substantially constant charging time for the capacitor irrespective of substantial variations in ambient temperature.

2. An elapsed time meter comprising a source of positive potential; an electrical pulse counter connected with said source through a first branch line; a uni-junction transistor having an emitter connected with the positive source through a second branch line, a first base connected with the positive source through a third branch line, and another grounded base; a transistor amplifier having its base connected with the uni-junction grounded base, its emitter connected with ground, and its collector connected with the pulse counter; capacitor means connected between said second branch line and ground; said second branch line including a resistance for controlling current flow to the capacitor means; said capacitor means being arranged to periodically discharge to the emitter of the uni-junction transistor to thus periodically establish a predetermined firing potential; said second branch line including a diode having a negative temperature coefficient of voltage whereby to maintain the charging time for the capacitor means substantially constant irrespective of ambient temperature variations; said capacitor means being connected to the second branch line at a point between the emitter and diode so that the diode is in the charging circuit but not in the discharging circuit of the capacitor means.

References Cited by the Examiner

UNITED STATES PATENTS

| | | | |
|---|---|---|---|
| 277,945 | 5/1883 | Rosquist | 235—91 |
| 2,433,608 | 12/1947 | Handley | 235—92 |
| 2,968,770 | 1/1961 | Sylvan | 331—111 |
| 3,047,224 | 7/1962 | Ray et al. | 235—92 |
| 3,074,028 | 1/1963 | Mammano | 331—111 |
| 3,163,808 | 12/1964 | Peterson | 318—130 |

RICHARD B. WILKINSON, *Primary Examiner.*

G. F. BAKER, *Assistant Examiner.*